(12) United States Patent
Obata et al.

(10) Patent No.: US 8,237,886 B2
(45) Date of Patent: Aug. 7, 2012

(54) OPTICAL SHEET, METHOD OF MANUFACTURING THE SAME, AND DISPLAY APPARATUS

(75) Inventors: Kei Obata, Miyagi (JP); Jun Shimizu, Miyagi (JP); Kentaro Okuyama, Miyagi (JP); Mitsuo Arima, Miyagi (JP); Mitsunari Hoshi, Miyagi (JP)

(73) Assignee: Sony Corporation, Tokyo (JP)

(*) Notice: Subject to any disclaimer, the term of this patent is extended or adjusted under 35 U.S.C. 154(b) by 935 days.

(21) Appl. No.: 12/261,716

(22) Filed: Oct. 30, 2008

(65) Prior Publication Data

US 2009/0109375 A1    Apr. 30, 2009

(30) Foreign Application Priority Data

Oct. 31, 2007 (JP) ................. 2007-283312

(51) Int. Cl.
G02F 1/1335 (2006.01)
(52) U.S. Cl. .......................... 349/64; 349/62
(58) Field of Classification Search .......... 349/64, 349/62
See application file for complete search history.

(56) References Cited

U.S. PATENT DOCUMENTS

| | | | |
|---|---|---|---|
| 4,293,435 A | 10/1981 | Portugall et al. | |
| 6,011,601 A * | 1/2000 | Kojima | 349/62 |
| 2003/0058386 A1 | 3/2003 | Bastiaansen et al. | |
| 2006/0061725 A1 | 3/2006 | Chiu et al. | |
| 2006/0108063 A1 | 5/2006 | Umemoto et al. | |
| 2006/0138702 A1 | 6/2006 | Biernath et al. | |
| 2008/0247192 A1* | 10/2008 | Hoshi et al. | 362/627 |

FOREIGN PATENT DOCUMENTS

| | | |
|---|---|---|
| EP | 1 818 697 | 8/2007 |
| JP | 01-273002 | 10/1989 |
| JP | HEI 01-273002 | 10/1989 |
| JP | 2000-221324 | 8/2000 |
| JP | 2003-005838 | 8/2003 |
| JP | 2004-198958 | 7/2004 |
| JP | 2006-024519 | 1/2006 |
| JP | 2006-064758 | 3/2006 |
| JP | 2006-126820 | 5/2006 |

(Continued)

OTHER PUBLICATIONS

Japanese Office Action issued on Oct. 7, 2009, for corresponding Japanese Patent Application JP 2007-283312.
Japanese Office Action issued on May 13, 2010, corresponding to Japanese Patent Appln. No. 2007-283312.
Japanese Office Action issued Dec. 21, 2010, corresponding to Japanese Appln. No. 2007-283312.

(Continued)

*Primary Examiner* — Wen-Ying P Chen
(74) *Attorney, Agent, or Firm* — K&L Gates LLP

(57) ABSTRACT

A method of manufacturing the optical sheet is provided. The method includes: a first step of heating a composition containing a liquid crystal monomer or liquid crystal prepolymer and a photopolymerization initiator at a temperature equal to or higher than a melting point of the liquid crystal monomer or liquid crystal prepolymer and pressing the composition in a state where the composition is held between a master including a plurality of solid structures disposed continuously in one surface and having shape anisotropy in the one surface and a light transmission film disposed so as to face the solid structures of the master. The method also includes a second step of irradiating the composition with ultraviolet rays at a temperature lower than a phase transmission temperature to an isotropic phase to polymerize the liquid crystal monomer or liquid crystal prepolymer and, after that, separating the light transmission film from the master.

7 Claims, 9 Drawing Sheets

FOREIGN PATENT DOCUMENTS

| | | |
|---|---|---|
| JP | 2007-206095 | 8/2007 |
| JP | 2007-213057 | 8/2007 |
| WO | 2005/006056 | 1/2005 |
| WO | 2006-716221 | 7/2006 |
| WO | 2007/032440 | 3/2007 |
| WO | 2007/117935 | 10/2007 |
| WO | 2007/019136 | 3/2009 |

OTHER PUBLICATIONS

European Search Report issued on May 13, 2009, for corresponding European Patent Application No. 08018820.4.
European Search Report issued on Feb. 19, 2009, for corresponding European Patent Application No. 08018820.4.
Japanese Office Action issued Dec. 20, 2011, corresponding to Japanese Appln. No. 2007-283312.

* cited by examiner

OPTICAL SHEET, METHOD OF MANUFACTURING THE SAME, AND DISPLAY APPARATUS

CROSS REFERENCE TO RELATED APPLICATIONS

The present application claims priority to Japanese Patent Application JP 2007-283312 filed in the Japanese Patent Office on Oct. 31, 2007, the entire contents of which is being incorporated herein by reference.

BACKGROUND

In recent years, liquid crystal display apparatuses have been replacing the CRT (Cathode Ray Tube) which has been the mainstream of display apparatuses because of its advantages of lower power consumption, smaller space, lower price, and the like.

The liquid crystal display apparatus is classified to some types by, for example, illuminating methods at the time of displaying an image. A representative liquid crystal display apparatus is a transmission-type liquid crystal display apparatus for displaying an image using a light source disposed at the back of a liquid crystal panel.

In such a display apparatus, it is extremely important to reduce consumption power and to increase display brightness in order to increase the commercial value of the display apparatus. Consequently, it is strongly demanded to increase the gain of an optical system provided between a liquid crystal panel and a light source while suppressing the power consumption of the light source as much as possible.

For example, a technique of providing a prism sheet as a brightness enhancement film between a liquid crystal panel and a light source is disclosed. The prism sheet is obtained by, for example, disposing a plurality of prisms each of an isosceles triangular prism shape having an apex angle of 90 degrees in parallel on a resin film. By using the light condensing effect of the prisms, surface brightness can be increased. Another technique is also disclosed, using prisms in which a refractive index in the extending direction of the prisms and a refractive index in the arrangement direction of the prisms are different from each other, in the prism sheet. In the prism sheet, by performing polarization separation by inclined surfaces of the prisms using interface reflection caused by variations in the critical angles in addition to the light condensing effect of the prisms, the surface brightness can be increased.

The prism sheet having the polarization separating function as described above can be manufactured by, for example, forming a plurality of solid structures on one surface in a sheet containing semi-crystalline or crystalline resin and stretching the sheet on which the solid structures are formed in one direction (refer to Japanese Unexamined Patent Application Publication No. H01-273002 and U.S. Patent Application No. 2006/0138702).

However, the manufacturing methods have problems such that solid structures easily collapse at the time of stretching and it is not easy to obtain a desired structure accurately.

It is therefore desirable to provide an optical sheet including a solid structure having refractive index anisotropy, whose shape hardly collapses and a display apparatus using the optical sheet. It is also desirable to provide a method of manufacturing an optical sheet, capable of accurately forming a solid structure having refractive index anisotropy.

SUMMARY

The present invention relates to an optical sheet having refractive index anisotropy, a method of manufacturing the same, and a display apparatus including an optical sheet having refractive index anisotropy.

According to an embodiment, there is provided an optical sheet provided with a plurality of solid structures disposed continuously in one surface and having shape anisotropy in the one surface. The solid structures contain liquid crystalline polymer having orientation in the one surface, and have refractive index anisotropy according to the orientation of the liquid crystalline polymer.

The liquid crystalline polymer is a polymer in which liquid crystal is formed and is also called a liquid crystal polymer, a polymer liquid crystal, or the like. The liquid crystalline polymers can be classified into three kinds of structures of a main-chain type, a side-chain type, and a complex type. The main-chain type is a type of a polymer having a region expressing crystallinity in the main chain. The side-chain type is a type of a polymer having a region expressing crystallinity in the side chain. The complex type is a type of a polymer having a region expressing crystallinity in both of the main and side chains. As another classifying method, the liquid crystalline polymer can be also classified into two types; a thermotropic polymer (thermal fusion type), and a lyotropic polymer (fusion type). A polymer of the thermal fusion type enters a liquid crystal state by being heated and melted. One of polymers of the thermal fusion type is a liquid crystal polymer (LCP). A polymer of the fusion type enters a liquid crystal state by being fused.

According to an embodiment, there is provided a display apparatus including: a display panel which is driven on the basis of an image signal; a pair of polarizers sandwiching the display panel; a light source for illuminating the display panel; and the above-mentioned optical sheet.

In the optical sheet and the display apparatus having the optical sheet of the embodiment, solid structures having shape anisotropy in one surface of the optical sheet contain a liquid crystalline polymer having orientation in the one surface and have refractive index anisotropy according to the orientation of the liquid crystalline polymer. The liquid crystalline polymer having orientation can be formed by heating a composition containing a liquid crystal monomer or liquid crystal prepolymer and a photopolymerization initiator at a temperature equal to or higher than a melting point of the liquid crystal monomer or liquid crystal prepolymer and pressing the composition in a state where the composition is held between a master including a plurality of solid structures disposed continuously in one surface and having shape anisotropy in the one surface and a light transmission film disposed so as to face the solid structures of the master, and irradiating the composition with ultraviolet rays at a temperature lower than a phase transmission temperature to an isotropic phase to polymerize the liquid crystal monomer or liquid crystal prepolymer. Since orientation may not be given to the liquid crystalline polymer by stretching, it can be said that the optical sheet is formed by a method other than stretching.

According to an embodiment, there is provided a method of manufacturing the optical sheet including the following two steps:

(A) a first step of heating a composition containing a liquid crystal monomer or liquid crystal prepolymer and a photopolymerization initiator at a temperature equal to or higher than a melting point of the liquid crystal monomer or liquid crystal prepolymer and pressing the composition in a state where the composition is held between a master including a plurality of solid structures disposed continuously in one surface and having shape anisotropy in the one surface and a light transmission film disposed so as to face the solid structures of the master; and (B) a second step of irradiating the composition with ultraviolet rays at a temperature lower than a phase transmission temperature to an isotropic phase to polymerize the liquid crystal monomer or liquid crystal prepolymer and, after that, separating the light transmission film from the master.

In the method of manufacturing an optical sheet of the embodiment, the liquid crystal monomer or liquid crystal prepolymer in the composition is heated at a temperature equal to or higher than the melting point, thereby becoming a liquid state. The composition in the liquid state is pushed and moved in the extending direction of the solid structures in the master by pressing, and liquid crystal orientation is realized. After that, the composition is irradiated with ultraviolet rays, so that the liquid crystal monomer or liquid crystal prepolymer is polymerized, and becomes liquid crystalline polymer having orientation in the extending direction of the solid structures in the master. In such a manner, without using stretching, refractive index anisotropy can be given to a composition.

In the optical sheet and the display apparatus of the embodiment, by using liquid crystalline polymer having orientation, refractive index anisotropy is developed in the solid structures of the optical sheet. Consequently, collapse in the shape due to stretching hardly occurs in the solid structures in the optical sheet. As a result, the optical sheet whose shape hardly collapses and including solid structures having refractive index anisotropy can be realized.

In the method of manufacturing the optical sheet of the embodiment, by sequentially performing the processes of heating, pressing, cooling, and ultraviolet irradiation on the composition containing the liquid crystal monomer or liquid crystal pre-polymer and a photopolymerization initiator, the refractive index anisotropy is developed in the solid structures in the optical sheet. Consequently, without using stretching, the refractive index anisotropy can be given to the solid structures in the optical sheet. Thus, the solid structures having the refractive index anisotropy can be formed accurately.

Additional features and advantages are described herein, and will be apparent from the following Detailed Description and the figures.

DETAILED DESCRIPTION

Embodiments will be described in detail hereinbelow with reference to the drawings.

Figure 1:
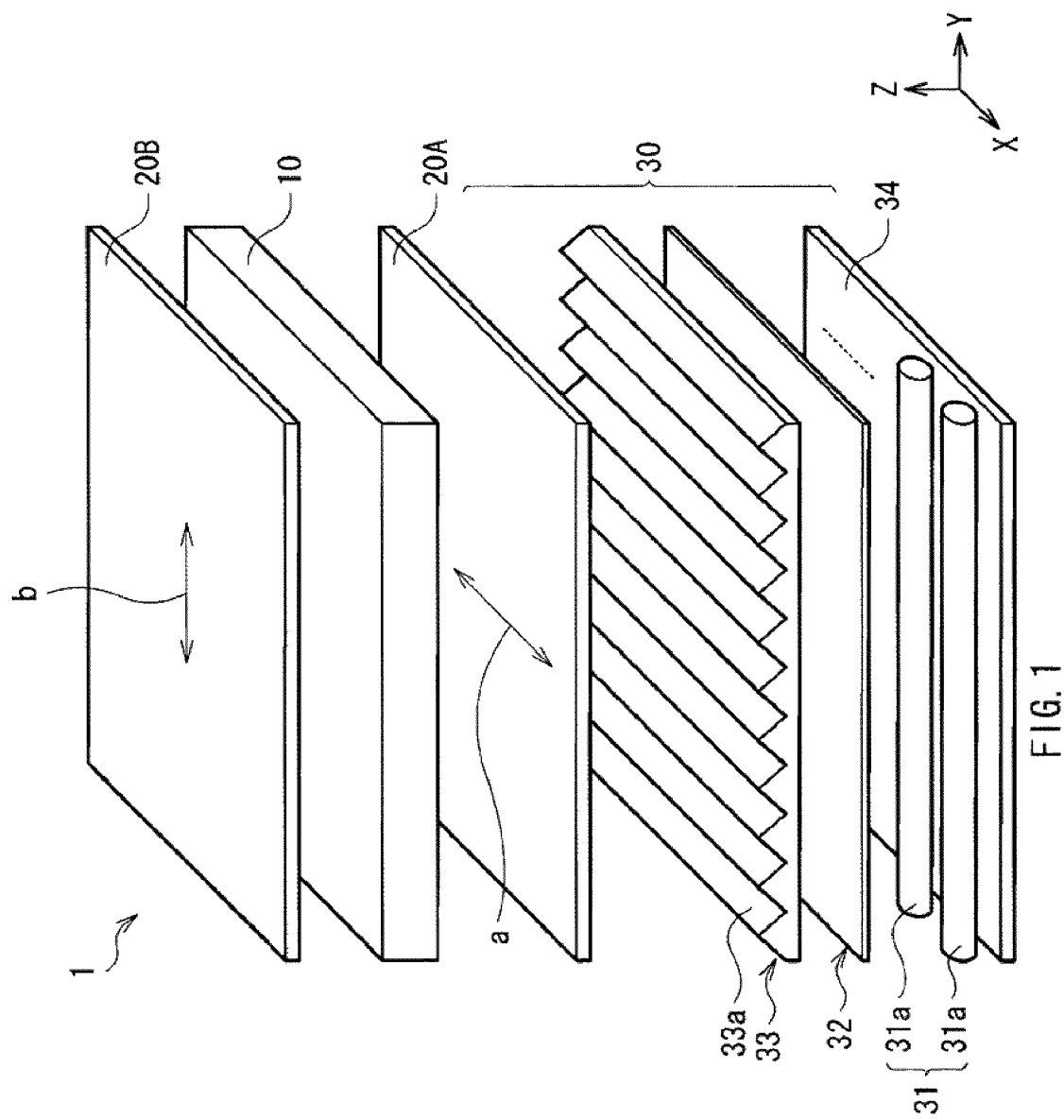
FIG. 1 is an expanded perspective view showing an example of the configuration of a display apparatus as a first embodiment.

FIG. 1 shows a schematic configuration of a display apparatus 1 according to an embodiment. The display apparatus 1 has a liquid crystal display panel 10, first and second polarizers 20A and 20B sandwiching the liquid crystal display panel 10, a lighting device 30 disposed on the back of the firs polarizer 20A, and a drive circuit (not shown) for driving the liquid crystal display panel 10 to display a video image. The surface of the second polarizer 20B is directed toward a user (not shown).

The liquid crystal display panel 10 is, for example, a transmission-type display panel in which pixels are driven according to a video signal and has a structure in which a liquid crystal layer is sandwiched by a pair of transparent substrates. Concretely, the liquid crystal display panel 10 has, in order from the side of the user, a transparent substrate, a color filter, a transparent electrode, an orientation film, a liquid crystal layer, an orientation film, a transparent pixel electrode, and a transparent substrate.

The transparent substrate is, generally, a substrate which is transparent to visible light. In the transparent substrate on the side of the illumination device 30, an active-type drive circuit including TFTs (Thin Film Transistors) as drive elements electrically connected to the transparent pixel electrode, wires, and the like is formed. The color filter is formed by disposing color filters for separating light emitted from the illumination device 30 to, for example, three primary colors of red (R), green (G), and blue (B). The transparent electrode is made of, for example, ITO (Indium Tin Oxide) and functions as a common opposite electrode. The orientation film is made of, for example, a high polymer material such as polyimide and performs a process of orientating the liquid crystals. The liquid crystal layer is made of, for example, liquid crystal in the VA (Vertical Alignment) mode, the TN (Twisted Nematic) mode, or the STN (Super Twisted Nematic) mode. The liquid crystal layer has the function of passing or interrupting light emitted from the illumination device 30 pixel by pixel by a voltage applied from a not-shown drive circuit. The transparent pixel electrode is made of, for example, ITO and functions as an electrode of each pixel.

The first polarizer 20A is a polarizer disposed on the light incidence side of the liquid crystal display panel 10, and the second polarizer 20B is a polarizer disposed on the light outgoing side of the liquid crystal display panel 10. The first and second polarizers 20A and 20B are a kind of an optical shutter and transmit only light in a predetermined oscillation direction. The first and second polarizers 20A and 20B are disposed so that their polarizing axes are different from each other by 90 degrees. With the configuration, the light emitted from the illumination device 30 passes through the liquid crystal layer or is interrupted.

The direction of the polarizing axis "a" (transmission axis) of the first polarizer 20A is determined by the relation between the refractive index of a brightness enhancement film 33 in the extending direction of projections 33a which will be described later and the refractive index of the brightness enhancement film 33 in the direction orthogonal to the extending direction of the projections 33a. Concretely, the direction of the polarizing axis "a" of the first polarizer 20A is set so that the refractive index of the brightness enhancement film 33 in the direction parallel to the polarizing axis "a" becomes lower than that of the brightness enhancement film 33 in the direction orthogonal to the polarizing axis "a."

For example, in the case where the refractive index of the brightness enhancement film 33 in the extending direction of the projections 33a is lower than that of the brightness enhancement film 33 in the direction orthogonal to the extending direction of the projections 33a, it is preferable to set the direction of the polarizing axis "a" of the first polarizer 20A to a direction parallel to the extending direction of the projections 33a as shown in FIG. 1. When the polarizing axis "a" and the extending direction of the projections 33a is not made coincide with each other in order to obtain a proper angle brightness distribution, to improve contrast of the liquid crystal display panel 10, and the like, the angle formed between the polarizing axis "a" and the extending direction of the projections 33a may be increased. In this case, the angle needs to be set in the range of more than 0 degree and less than 45 degrees, more preferably, in the range of more than 0 degree and less than 20 degrees, in order to improve the surface brightness.

On the other hand, in the case where refractive index of the brightness enhancement film 33 in the direction orthogonal to the extending direction of the projections 33a is lower than that of the brightness enhancement film 33 in the extending direction of the projections 33a, it is preferable to set the direction of the polarizing axis "a" of the first polarizer 20A to the direction orthogonal to the extending direction of the projections 33a. However, when the polarizing axis "a" and the direction orthogonal to the extending direction of the projections 33a is not made coincide with each other for reasons similar to the above, the angle formed between the polarizing axis "a" and the extending direction of the projections 33a may be increased. In this case, the angle has to be set in the range of more than 0 degree and less than 45 degrees, more preferably, in the range of more than 0 degree and less than 20 degrees, in order to improve the surface brightness.

In the embodiment, the brightness enhancement film 33 corresponds to a concrete example of the "optical sheet," and the projection 33a corresponds to a concrete example of the "solid structure."

The lighting device 30 has a light source 31. For example, on the liquid crystal display panel 10 side of the light source 31, a diffusion sheet 32 and the brightness enhancement film 33 are disposed in order from the light source 31 side. On the other hand, a reflection sheet 34 is disposed on the back of the light source 31. In the embodiment, the lighting device 30 is of a so-called just-below-type. Alternatively, the lighting device 30 may be of, for example, a side edge type using a light guide plate.

In the light source 31, for example, a plurality of linear light sources 31a are disposed in parallel at equal intervals (for example, 20 mm intervals). Examples of the linear light sources 31a are a hot cathode fluorescent lamp (HCFL), a cold cathode fluorescent lamp (CCFL), and the like. The light source 31 may be obtained by two-dimensionally arranging point light sources such as LEDs (Light Emitting Diodes) or surface light sources such as organic EL (Electro Luminescence).

The reflection sheet 34 is, for example, a foamed PET (polyethylene terephthalate) or evaporated silver film, a multilayer reflection film, or the like and reflects part of light emitted from the light source 31 toward the liquid crystal display panel 10. By the reflection sheet 34, the light emitted from the light source 31 can be efficiently used.

The diffusion sheet 32 is, for example, a diffusion plate formed by dispersing a diffusion material (fillers) into a relatively-thick plate-shaped transparent resin, a diffusion film formed by coating the surface of a transparent resin in a relatively-thin film shape with a transparent resin (binder) including the diffusion material, or a combination of the diffusion plate, and the diffusion film. As the plate-shape or film-shape transparent resin, for example, PET, acryl, polycarbonate, or the like is used. As the diffusing material, for example, inorganic fillers made of SiO2 or the like, organic fillers made of acrylic, or the like is used.

Figure 2:
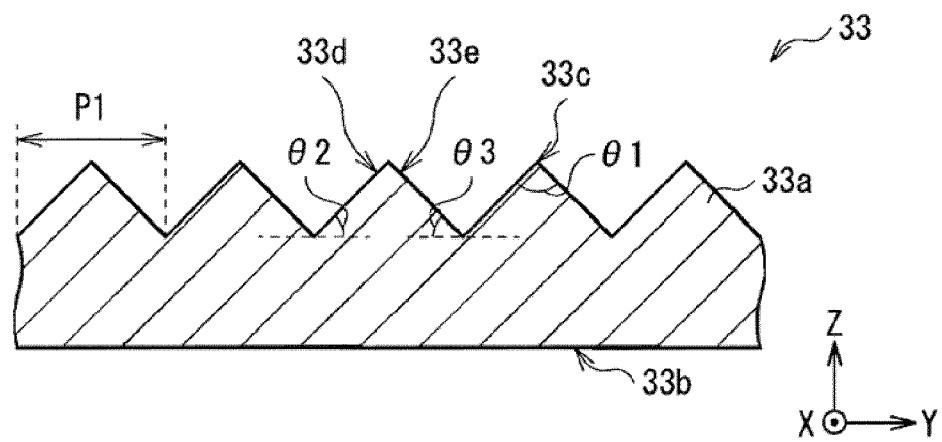
FIG. 2 is a cross section showing an example of the configuration of a brightness enhancement film in FIG. 1.

The brightness enhancement film 33 is made of, for example, a resin material having translucency, and the surface including the brightness enhancement film 33 is disposed so as to be parallel with the surface of the liquid crystal display panel 10. In the face (surface) on the light outgoing side of the brightness enhancement film 33, as shown in FIGS. 1 and 2, the plurality of columnar projections 33a extend in one direction in the surface on the light outgoing side and are arranged continuously in the direction crossing the extending direction. The face (back side 33b) of the brightness enhancement film 33 is, for example, a flat surface. FIG. 2 is an enlarged cross section of a part of the section of the brightness enhancement film 33. FIG. 1 shows the case where the plurality of columnar projections 33a are continuously disposed in parallel in a direction orthogonal to the extending direction.

Each of the projections 33a has, for example, a triangular prism shape having inclined surfaces 33d and 33e which are in contact with an apex 33c of an apex angle $\theta_1$ as shown in FIG. 2. The inclined surfaces 33d and 33e are disposed so as to obliquely face the surface including the brightness enhancement film 33 at base angles $\theta_2$ and $\theta_3$, respectively. A width (pitch $P_1$) in the arrangement direction of the projections 33a is, for example, in the range of 10 µm to 350 µm. The projection 33a is not limited to a triangular prism shape as shown in FIG. 2 but may be a polygonal column shape such as a pentagonal prism shape or may have a curved shape such as an oval shape or aspheric shape (for example, a cylindrical shape) in a direction orthogonal to the extending direction of the projection 33a.

The projections 33a may not have the same shape and the same size. For example, (A) sets of solid structures each made of two neighboring projections 33a having the same shape, one of which is taller (larger) and the other is shorter (smaller), may be arranged at equal pitches in the arrangement direction, (B) sets of solid structures each made of two neighboring projections 33a having different shapes and having the same height may be arranged at equal pitches in the arrangement direction, and (C) sets of two neighboring projections 33a having different shapes and different sizes (heights) may be arranged at equal pitches in the arrangement direction. A plurality of projections and recesses may be provided in the extending direction of each of the projections 33a.

With the configuration, the projection 33a refracts and transmits components in the arrangement direction of the projections 33a in light incident from the back side 33b of the brightness enhancement film 33 to a direction orthogonal to the liquid crystal display panel 10, thereby increasing the directionality. In the projection 33a, a component in the extending direction of the projections 33a in light incident from the back side 33b of the brightness enhancement film 33 does not produce much light condensing effect by the refraction operation of the projections 33a.

In the embodiment, each of the projections 33a has refractive index anisotropy that the refractive index in one direction is higher than that in a direction orthogonal to the one direction. Concretely, in the projection 33a, the refractive index in a direction parallel to the polarizing axis "a" is lower than that in a direction orthogonal to the polarizing axis "a." In the case where the refractive index in the extending direction of the projection 33a is lower than that in the arrangement direction of the projections 33a, preferably, the extending direction of the projections 33a is parallel to the polarizing axis "a." On the contrary, in the case where the refractive index in the extending direction of the projections 33a is higher than that in the arrangement direction of the projections 33a, preferably, the extending direction of the projections 33a is orthogonal to the polarizing axis "a."

As described above, in the embodiment, each projection 33a has the refractive index anisotropy that the refractive index in a direction parallel to the polarizing axis "a" is lower than that in a direction orthogonal to the polarizing axis "a." Consequently, the projection 33a can reflect light more in the direction orthogonal to the polarizing axis "a" and, by recycling the return light, light in the direction parallel to the polarizing axis "a" can be increased. Therefore, the transmission characteristic of light incident on the brightness enhancement film 33 can be changed according to a polarizing state. The recycle efficiency in the case where the projections 33a are provided on the light outgoing side (surface) is higher than that in the case where the projections 33a are provided on the light incidence side (back side) because of the critical angle.

The in-plane anisotropy in the refractive index can be expressed by stretching a sheet including semi-crystallinity or crystallinity in one direction. In the embodiment, by using the manufacturing method which will be described later, the in-plane anisotropy of the refractive index is developed without using stretching. An example of a material expressing the in-plane anisotropy of the refractive index without performing stretching is a liquid-crystalline polymer having orientation.

The liquid-crystalline polymer is a polymer in which liquid crystal is formed and is also called a liquid crystal polymer, a polymer liquid crystal, or the like. The liquid-crystalline polymers can be classified into three kinds of structures of a main-chain type, a side-chain type, and a complex type. The main-chain type is a type of a polymer having a region expressing crystallinity in the main chain. The side-chain type is a type of a polymer having a region expressing crystallinity in the side chain. The complex type is a type of a polymer having a region expressing crystallinity in both of the main and side chains. As another classifying method, the liquid-crystalline polymer can be also classified into two types; a thermotropic polymer (thermal fusion type), and a lyotropic polymer (fusion type). A polymer of the thermal fusion type enters a liquid crystal state by being heated and melted. One of polymers of the thermal fusion type is a liquid crystal polymer (LCP). A polymer of the fusion type enters a liquid crystal state by being fused.

The liquid-crystalline polymer is, for example, a material which can be formed by irradiating a composition containing a liquid-crystalline monomer or a liquid-crystalline prepolymer and a photopolymerization initiator with ultraviolet rays to polymerize the liquid-crystalline monomer or liquid-crystalline prepolymer.

Next, the function of the brightness enhancement film 33 in the case where the refractive index in the whole brightness enhancement film 33 in the extending direction of the projections 33a and that in the arrangement direction of the projections 33a are different from each other will be described.

Figure 3:
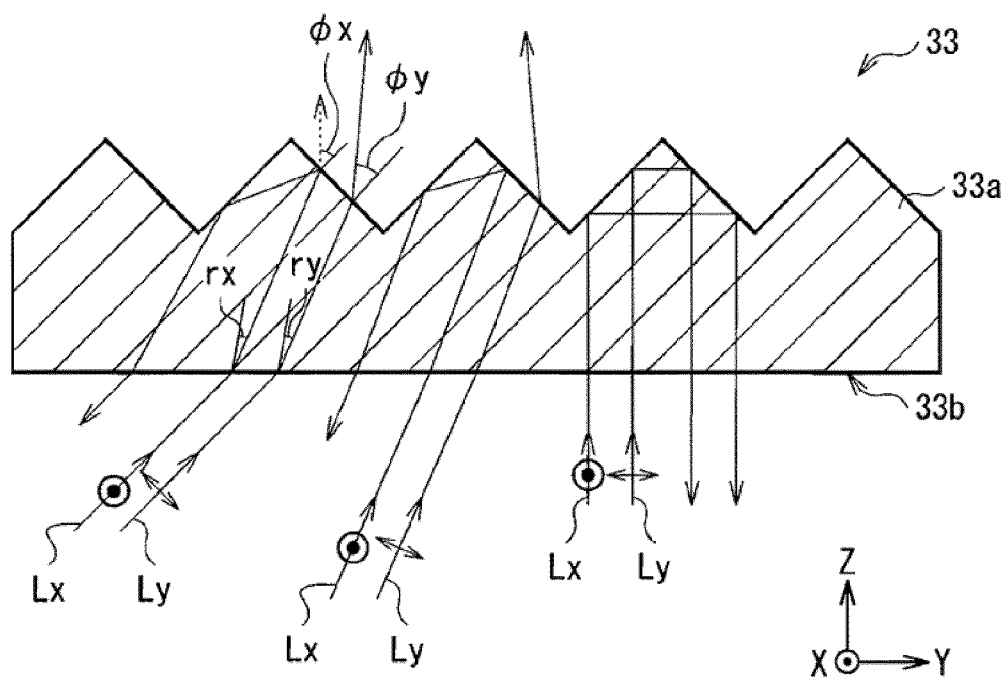
FIG. 3 is a conceptual diagram for explaining optical characteristics of the brightness enhancement film in FIG. 1.

FIG. 3 shows an example of a path of light when light of the lighting device 33 is incident from the back side of the brightness enhancement film 33 in the case where the brightness enhancement film 33 is made of a material in which a refractive index nx in the extending direction of the projections 33a is higher than a refractive index ny in the arrangement direction of the projections 33a (nx>ny). In FIG. 3, Lx indicates a polarization component which oscillates in the extending direction (X direction) of the projections 33a in light of the lighting device 30. Ly indicates a polarization component which oscillates in the arrangement direction (Y direction) of the projections 33a in the light of the lighting device 30.

Since the refractive index in the extending direction of the projections 33a is different from that in the arrangement direction of the projections 33a (nx>ny in FIG. 3), light of the lighting device 30 incident obliquely on the surface including the brightness enhancement film 33 refracts at different refraction angles rx and ry (rx<ry in FIG. 3) in an X-direction polarization component Lx and a Y-direction polarization component Ly of light of the lighting device 30 on the back side of the brightness enhancement film 33, and the resultant light goes out from the surface (the light outgoing surface of the projections 33a) of the brightness enhancement film 33 at different emission angles φx and φy (φx>φy in FIG. 3).

Fresnel Reflection

Since the brightness enhancement film 33 has different refractive indexes in the extending direction of the projections 33a and the arrangement direction of the projections 33a (nx>ny in FIG. 3), the polarization components oscillating in the directions are reflected by an interface such as the back side of the brightness enhancement film 33 and a light outgoing surface of the projections 33a at different reflectances. Therefore, in the case where the refractive index nx in the extending direction of the projections 33a in the entire brightness enhancement film 33 is higher than the refractive index ny in the arrangement direction of the projections 33a (the case A), the reflection amount of Lx is larger than that of Ly. Consequently, the light amount of Ly becomes larger than that of Lx in the light passed through the brightness enhancement film 33. On the contrary, when the refractive index nx in the extending direction of the projections 33a in the entire brightness enhancement film 33 is lower than the refractive index ny in the arrangement direction of the projections 33a (the case B), the reflection amount of Ly is larger than that of Lx. Consequently, the light amount of Lx becomes larger than that of Ly in the light passed through the brightness enhancement film 33.

Since the brightness enhancement film 33 has different refractive indexes in the extending direction of the projections 33a and the arrangement direction of the projections 33a (nx>ny in FIG. 3), the polarization components oscillating in the directions are reflected by an interface such as the back side of the brightness enhancement film 33 and the light incidence surface of the projections 33a at different critical angles. Therefore, in the case A, as shown in a center part of FIG. 3, when a certain incidence angle of light incident on the light emission surface is larger than the critical angle of Lx and smaller than the critical angle of Ly, Lx is totally reflected, and Ly passes through the light outgoing surface. Therefore, a perfect polarization separation state can be realized such that the polarization component Lx is repeatedly total-reflected by the light outgoing surface of the projections 33a and becomes return light and only the polarization component Ly passes through the light outgoing surface of the projections 33a. On the contrary, in the case B, when a certain incidence angle of light incident on the light emission surface is larger than the critical angle of Ly and smaller than the critical angle of Lx, Ly is totally reflected, and Lx passes through the light outgoing surface. Therefore, a perfect polarization separation state can be realized such that the polarization component Ly is repeatedly total-reflected by the light outgoing surface of the projections 33a and becomes return light and only the polarization component Lx passes through the light outgoing surface of the projections 33a.

When the incidence angle of light of the lighting device 30 to the light outgoing surface of the projections 33a becomes too large, in both of the cases A and B, as shown in the right part of FIG. 3, light of the lighting device 30 repeats total reflection on the light outgoing surface of the projections 33a regardless of the polarization state and becomes return light which returns to the lighting device 30 side.

The light reflected by the surface or back side of the brightness enhancement film 33 is reflected by the surface of the reflection sheet 34 (FIG. 1) or the diffusion sheet 32 of the lighting device 30 and unpolarized, and the unpolarized light is incident again on the brightness enhancement film 33. Consequently, the light amount of one of the polarization components (Ly in FIG. 3) can be made much larger than that of the other polarization component (Lx in FIG. 3). As a result, the efficiency for light utilization becomes higher and the surface brightness improves as compared with the case where each of the projections 33a does not have the polarization separation action.

In the case where the brightness enhancement film 33 is adhered from the back side 33b to a light transmission film or in the case where only the projections 33a of the brightness enhancement film 33 have refractive index anisotropy in the surface, a surface in contact with the light transmission film and the bottom part of the projections 33b function as the back side 33b in the case where the whole brightness enhancement film 33 has refractive index anisotropy. Therefore, also in the case where the brightness enhancement film 33 is adhered from the back side 33b and in the case where only the projections 33a of the brightness enhancement film 33 have refractive index anisotropy, an optical function similar to that in the case where the whole brightness enhancement film 33 has the refractive index anisotropy in the surface is displayed.

In such a manner, by the brightness enhancement film 33, the surface brightness is improved by the polarization separation action in addition to the light condensing action.

Figure 5A:
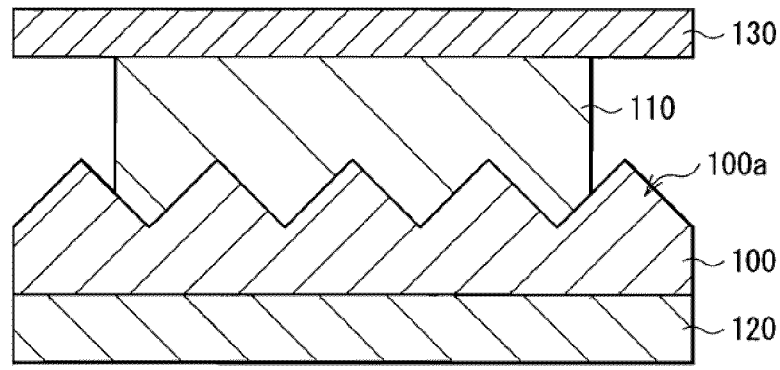
FIGS. 5A to 5C are cross sections illustrating a process subsequent to FIGS. 4A and 4B.
Figure 5B:
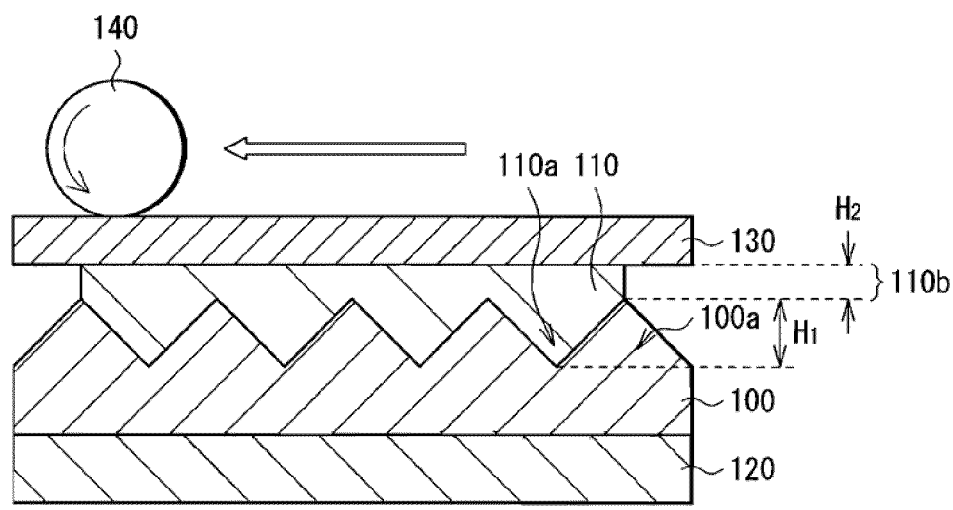
Figure 5C:
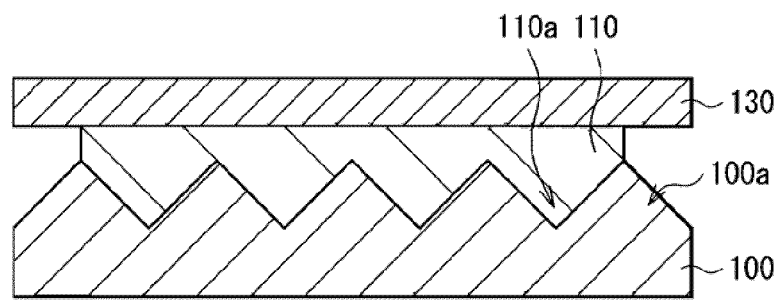
Figure 6A:
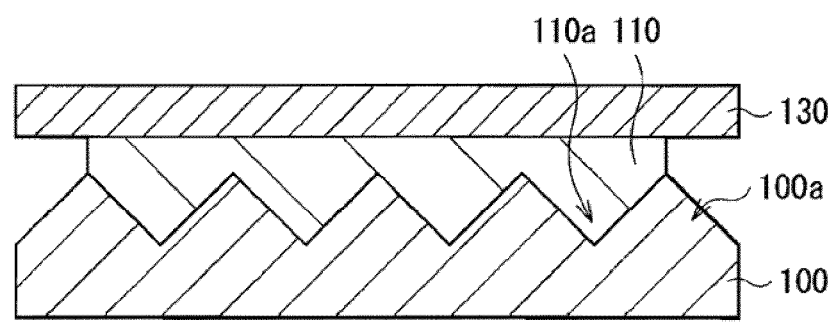
FIGS. 6A and 6B are cross sections illustrating a process subsequent to FIGS. 5A to 5C.
Figure 6B:
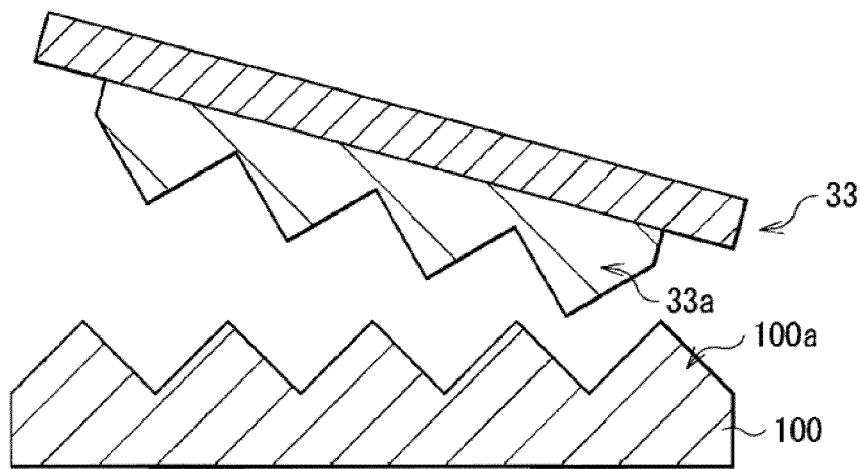
Figure 7:
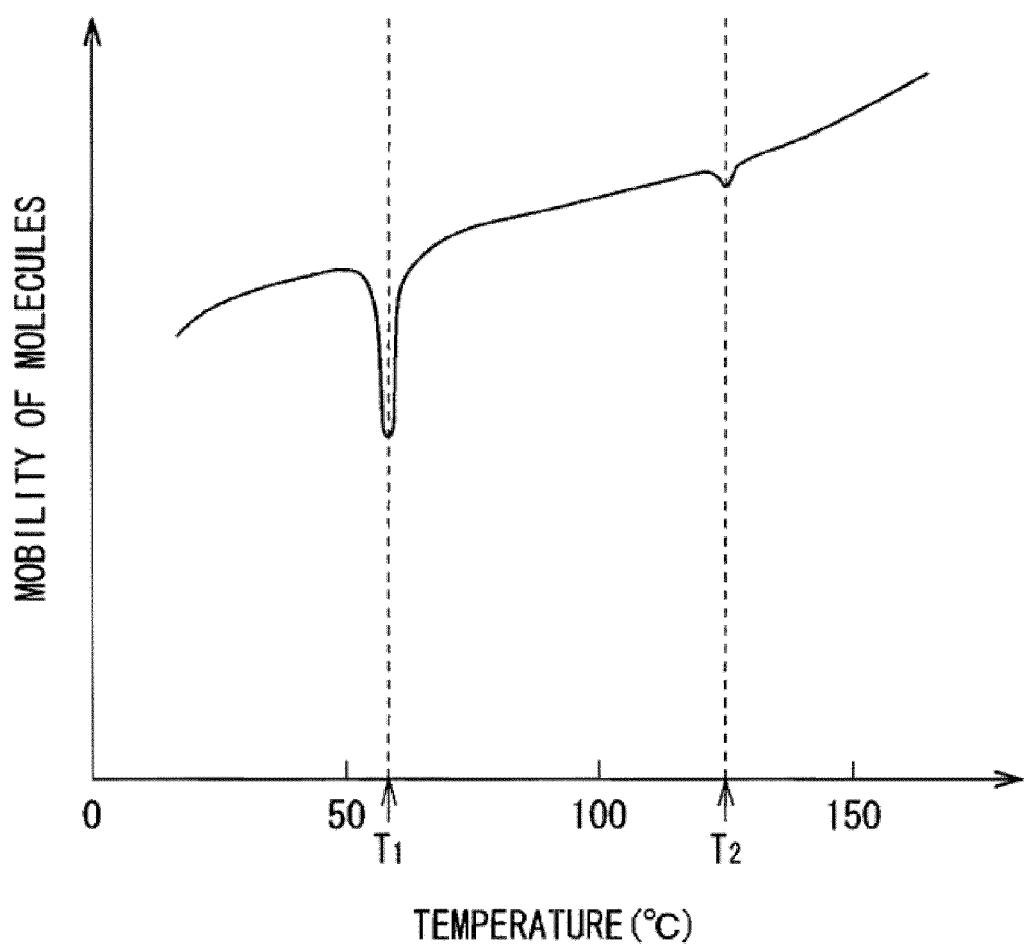
FIG. 7 is a characteristic diagram for explaining a DSC curve.

With reference to FIGS. 4A and 4B, FIG. 5A to 5C, FIGS. 6A and 6B, and FIG. 7, an example of the method of forming the brightness enhancement film 33 will be described. Each of FIGS. 4A to 4C, FIGS. 5A to 5C, and FIGS. 6A and 6B shows a sectional configuration for explaining a process of forming the brightness enhancement film 33. FIG. 7 shows an example of a DSC curve of the liquid crystalline monomer or the liquid crystalline pre-polymer. In FIG. 7, $T_1$ indicates a phase transition temperature (melting point) to a liquid crystal phase, and $T_2$ indicates a phase transition temperature to an isotropic phase.

Figure 4A:
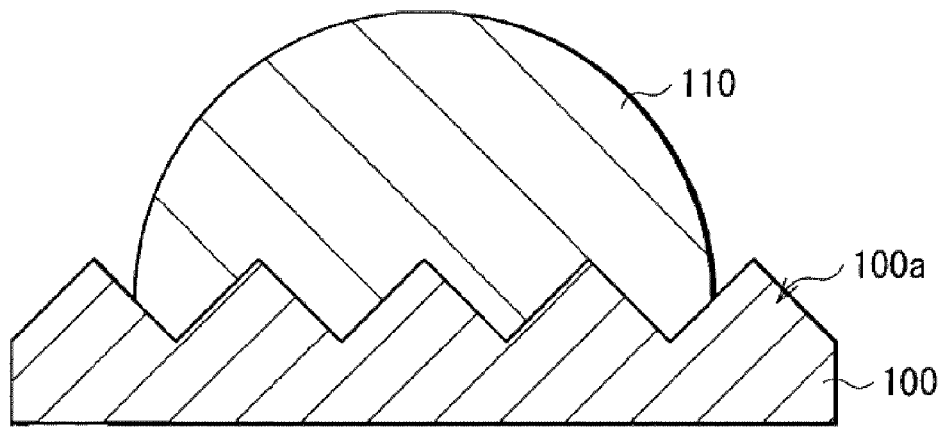
FIGS. 4A and 4B are cross sections for explaining an example a method of forming the brightness enhancement film in FIG. 1.

First, a master 100 including a plurality of projections 100a disposed continuously in a surface and having shape anisotropy in one surface is prepared (refer to FIG. 4A). An irregular shape formed by the plurality of projections 100a of the master 100 is inverse to an irregular shape formed by the plurality of projections 33a two-dimensionally disposed on the brightness enhancement film 33. Next, a composition 110 (solution) obtained by mixing a solution obtained by dissolving a liquid crystal monomer or a liquid crystal prepolymer to a solvent with a photopolymerization initiator is prepared. In place of the solution, a composition 110 (liquid crystal adjustment powders) obtained by mixing the liquid crystal monomer or liquid crystal prepolymer with a photopolymerization initiator may be used.

Figure 4B:
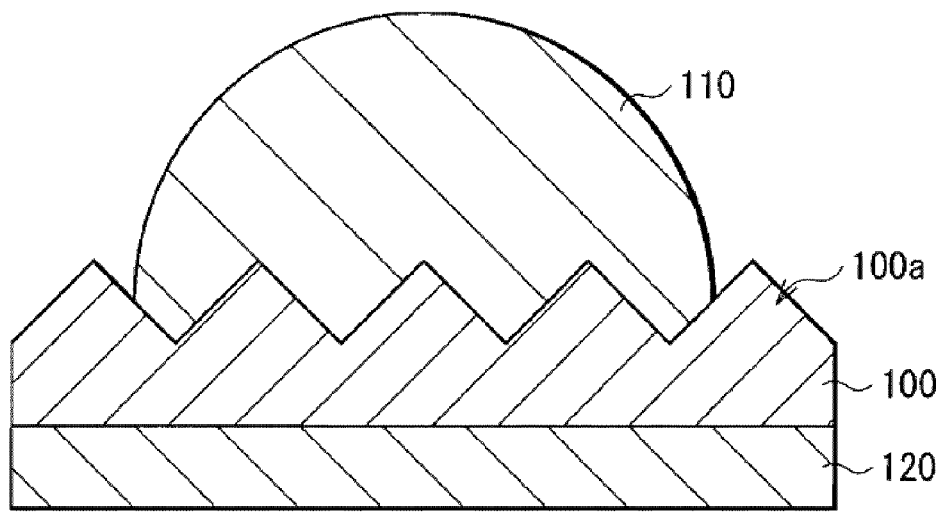

Subsequently, the composition 110 is disposed on the projections 100a of the master 100 (FIG. 4A). After that, the master 100 is disposed on a hot plate 120 and heated at a temperature equal to or higher than the melting point T1 (for example, 170° C. (refer to FIG. 7) of the liquid crystal monomer or liquid crystal prepolymer contained in the composition 110 (FIG. 4B). In the case of using the above-described solution as the composition 110, the viscosity of the composition 110 decreases, the composition 110 comes into contact with the projections 100a without gaps, and the solvent contained in the composition 110 evaporates. In the case of using the liquid crystal adjustment powders as the composition 110, the composition 110 dissolves, the viscosity of the composition 110 decreases, and the composition 110 comes into contact with the projections 100a without gaps.

After that, the temperature of the hot plate 120 is decreased to a temperature (for example, 140° C.) equal to or higher than the melting point $T_1$, and a light transmission film 130 is put on the composition 110 (FIG. 5A). In such a manner, in a state where the composition 110 is held between the master 100 and the light transmission film 130 disposed so as to face the projections 100a of the master 100, the composition 110 is heated at a temperature (for example, 120° C.) equal to or higher than the melting point $T_1$ and equal to or lower than the phase transition temperature $T_2$ and pressed. For example, while making a press roller 140 rotate on the light transmission film 130 as shown in FIG. 5B, the composition 110 is pressed against the projections 100a of the master 100 via the light transmission film 130. By the press, the composition 110 is pressed and moved in the extending direction of the projections 100a among the neighboring projections 100a and in the gaps between the projections 100a. As a result, the liquid crystal orientation is achieved in the composition 110, and an optical function layer including the projections 110a having a height $H_1$ and a flange 110b having a thickness $H_2$ is formed.

After that, the hot plate 120 is detached from the master 100 (FIG. 5C). The composition 110 is irradiated with an ultraviolet ray L. For example, as shown in FIG. 6A, the composition 110 is irradiated with the ultraviolet rays L from the light transmission film 130 side to polymerize the liquid crystal monomer or liquid crystal prepolymer contained in the composition 110 from the light transmission film 130 side. As a result, the liquid crystal monomer or liquid crystal prepolymer becomes a liquid crystalline polymer having orientation in the extending direction of the projections 100a of the master 100. Finally, the light transmission film 130 is peeled off from the master 100 (FIG. 6B). In such a manner, the brightness enhancement film 33 provided with the composition 110 containing the liquid crystalline polymer having orientation and the light transmission film 130 is formed.

The brightness enhancement film 33 can be also formed by, for example, the following method.

Figure 8:
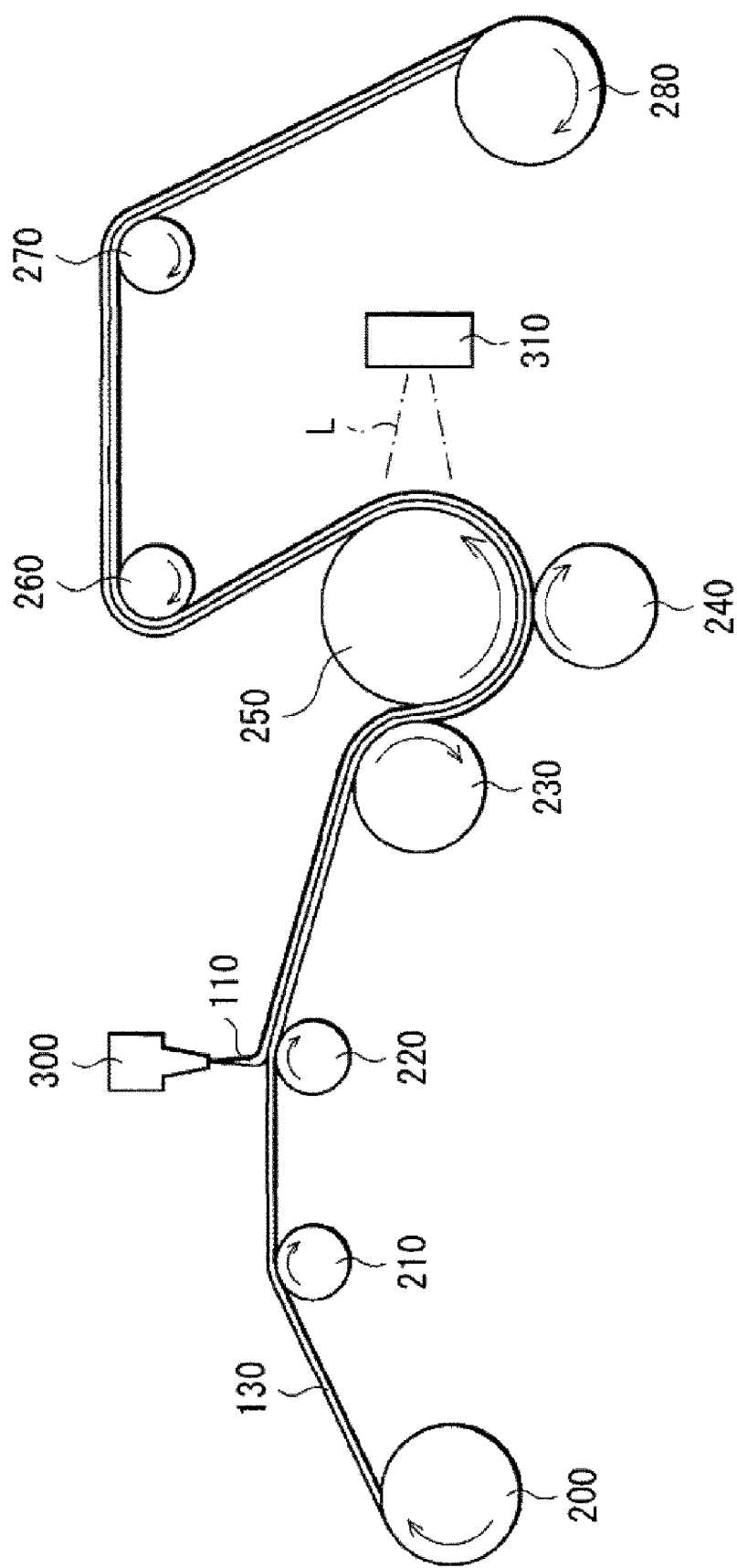
FIG. 8 is a schematic configuration diagram of a manufacturing apparatus for forming the brightness enhancement film in FIG. 1 according to another method.

FIG. 8 shows an example of an apparatus for manufacturing the brightness enhancement film 33. The manufacturing apparatus includes a feed roll 200, guide rolls 210, 260, and 270, heat rolls 220 and 230, heat regulation rolls 240 and 250, a discharger 300, and an ultraviolet irradiation apparatus 310. The feed roll 200 is obtained by winding the light transmission film 130 concentrically and provided to supply the light transmission film 130. The light transmission film 130 fed from the feed roll 200 is conveyed in order of the guide roll 210, the heat rolls 220 and 230, the heat regulation roll 240, and the guide rolls 260 and 270 and is finally taken up by the take-up roll 280. The heat regulation roll 250 is disposed for the heat rolls 230 and 240 via a predetermined gap. The discharger 300 is provided for a part which is in contact with the heat roll 220, of the light transmission film 130 supplied from the feed roll 200 via a predetermined gap. The ultraviolet irradiation apparatus 310 irradiates a part passed through the heat roll 240, of the light transmission film 130 supplied from the feed roll 200, the part being in contact with the heat regulation roll 250, with ultraviolet rays.

The guide roll 210 is provided to guide the light transmission film 130 supplied from the feed roll 220 to the heat roll 220. The heat roll 220 can generate heat at a temperature from normal temperature to about 200° C. The heat roll 220 is set to, for example, a heat generation temperature (140° C.) equal to or higher than the melting point $T_1$. The discharger 300 is provided for a part which is in contact with the heat roll 220, of the light transmission film 130 supplied from the feed roll 200 via a predetermined gap. The discharger 300 is provided to drop the composition 110 obtained by mixing a thermally-dissolved liquid crystal monomer or liquid crystal prepolymer with a photopolymerization initiator onto the light transmission film 130 while heating the composition 110 at a temperature (for example, 160° C.) equal to or higher than the melting point $T_1$. The heat roll 230 can generate heat from the normal temperature to about 200° C. and is set to, for example, a heat generation temperature (120° C.) equal to or higher than the melting point $T_1$. The temperature regulation rolls 240 and 250 can regulate the temperature from normal temperature to about 90° C. and are set to, for example, a cooling temperature (normal temperature) lower than the phase transition temperature $T_2$. In the peripheral surface of the temperature regulation roll 250, a plurality of projections disposed continuously and having shape anisotropy in the peripheral surface are formed. A tongued and grooved shape formed by the plurality of projections formed in the peripheral surface is inverse to a tongued and grooved shape formed by the plurality of projections 33a two-dimensionally disposed on the brightness enhancement film 33. The guide roll 260 is provided to peel off the light transmission film 130 over the temperature regulation roll 250. The guide roll 270 is provided to guide the light transmission film 130 taken off by the guide roll 260 toward the take-up roll 280.

Using the manufacturing apparatus having such a configuration, the brightness enhancement film 33 is formed. Concretely, first, the light transmission film 130 fed from the feed roll 200 is guided via the guide roll 210 to the heat roll 220. After that, the composition 110 obtained by mixing a heat-dissolved liquid crystal monomer or liquid crystal prepolymer with a photopolymerization initiator is dropped from the discharger 300 onto the light transmission film 130. The composition 110 is heated at a temperature equal to or higher than the melting point $T_1$ (for example, 140° C.) (refer to FIG. 7). After that, the composition 110 is pressed against the projections formed in the peripheral surface of the temperature regulation roll 250 while maintaining the temperature of the composition 110 on the light transmission film 130 at a temperature equal to or higher than the melting point $T_1$ by the heat roll 230. By the operation, the composition 110 is tightly in contact with the projections on the temperature regulation roll 250. By the press, the composition 110 is pressed and moved in the extending direction of the projections in the gaps between the projections neighboring each other. As a result, the optical function layer including the projections 110a having the height $H_1$ and the flange 110b having the thickness $H_2$ is formed in the composition 110.

After that, the composition 110 is cooled to a temperature lower than the phase transition temperature $T_2$ by the temperature regulation rolls 240 and 250. The cooled composition 110 is irradiated with the ultraviolet rays ☐ emitted from the ultraviolet irradiation apparatus 310. With the ultraviolet rays L, the liquid crystal monomer or liquid crystal prepolymer contained in the composition 110 is polymerized from the light transmission film 130 side, so that the liquid crystal monomer or liquid crystal pre-polymer becomes a liquid-crystalline polymer having orientation in the extending direction of the projections of the temperature regulation roll 250. Finally, the light transmission film 130 is taken off from the temperature regulation roll 250 by the guide roll 260 and taken up by the take-up roll 280 via the guide roll 270. In such a manner, the brightness enhancement film 33 having the composition 110 containing the liquid crystalline polymer having orientation and the light transmission film 130 is formed.

In the case of manufacturing the brightness enhancement film 33 by any of the above-described manufacturing methods, preferably, the thickness $H_2$ of the flange 110b is 40% of the height $H_1$ of the projection 110a or less.

Figure 9:
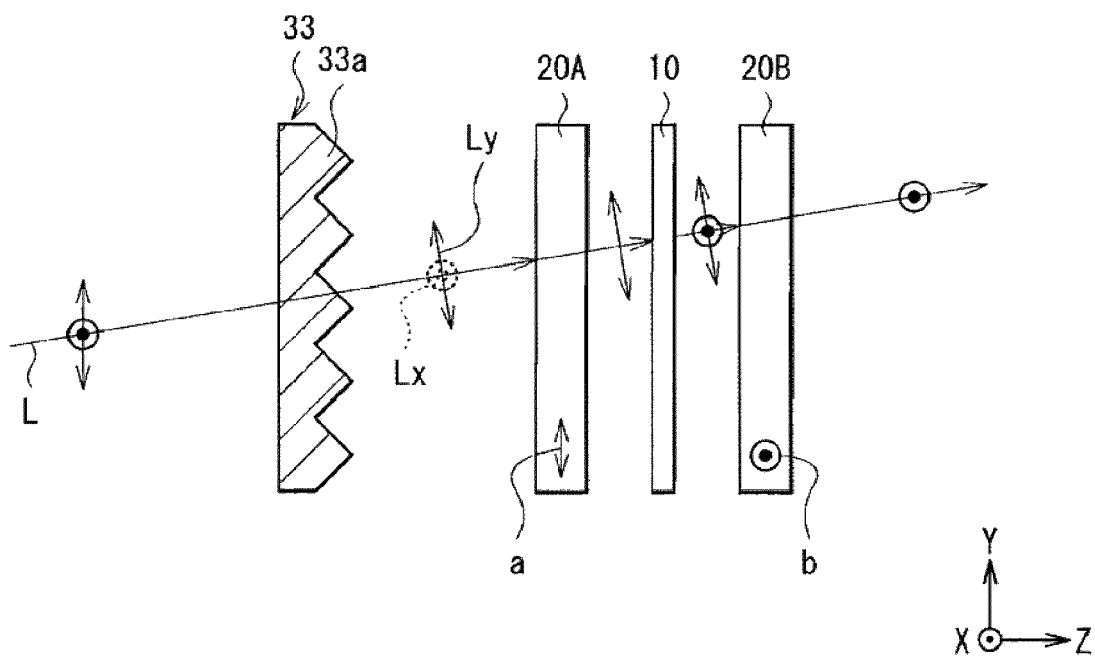
FIG. 9 is a schematic configuration diagram for explaining the operation of the display apparatus of FIG. 1.

The action at the time of displaying an image in the display apparatus 1 of the embodiment will be described with reference to FIG. 9. FIG. 9 schematically shows an example of the action of the display apparatus 1.

The unpolarized light L emitted from the lighting device 30 and passed through the diffusion sheet 31 is incident on the back side of the brightness enhancement film 33 and increases its orientation by the light condensing action of the projections 33a. At this time, the light L is separated to a polarization component (Ly in FIG. 9) parallel to the polarization axis "a" of the first polarizer 20A by the polarization separation action of the projections 33a and enters the first polarizer 20A.

A polarization component (Lx in FIG. 9) crossing the polarizing axis "a" in the light L incident on the first polarizer 20A is absorbed by the first polarizer 20A, and the polarization component (Ly in FIG. 9) parallel to the polarization axis "a" passes through the first polarizer 20A. The polarization component Ly passed through the first polarizer 20A is subjected to polarization control on a pixel unit basis in the liquid crystal display panel 10. The polarization component Ly is incident on the second polarizer 20B. Only the polarized light of the polarizing axis "b" of the second polarizer 20B passes and an image is formed on the panel front surface. In such a manner, an image is displayed in the display apparatus 1.

In the embodiment, the projections 33a having shape anisotropy in one surface of the brightness enhancement film 33 contains the liquid crystalline polymer having orientation in the one surface and has refractive index anisotropy according to the orientation of the liquid crystalline polymer. For example, in a state where the composition 110 containing the liquid crystal monomer or liquid crystal pre-polymer and the photopolymerization initiator is held between the master 100 including the plurality of projections 100a disposed continuously in one surface and having shape anisotropy in one surface and the light transmission film 130 disposed so as to face the projections 100a of the master 100, the composition 110 is heated at a temperature equal to or higher than the phase transition temperature $T_2$ and pressed. After that, the composition 110 is cooled to a temperature lower than the phase transition temperature $T_2$. The composition 110 cooled to a temperature lower than the phase transistor temperature $T_2$ is irradiated with ultraviolet rays to polymerize the liquid crystal monomer or liquid crystal prepolymer. In such a manner, the liquid crystalline polymer having orientation can be formed. Since it is impossible to provide the liquid crystalline polymer with orientation by stretching, the brightness enhancement film 33 of the embodiment may not be formed by using stretching but can be formed by the above-described method. Consequently, the shape of the projections 33a in the brightness enhancement film 33 is not broken by stretching, so that the brightness enhancement film 33 including the projections 33a having refractive index anisotropy whose shape is hardly broken can be realized.

In the method of manufacturing the brightness enhancement film 33 of the embodiment, by sequentially performing the processes of heating, pressing, cooling, and ultraviolet irradiation on the composition 110 containing the liquid crystal monomer or liquid crystal pre-polymer and a photopolymerization initiator, the refractive index anisotropy is developed in the projections 33a of the brightness enhancement film 33. Consequently, without using stretching, the refractive index anisotropy can be given to the projections 33a of the brightness enhancement film 33. Thus, the projections 33a having the refractive index anisotropy can be formed accurately.

EXAMPLES

Examples 1 and 2 of the brightness enhancement film 33 of the foregoing embodiment will be described in comparison with comparative examples 1 to 3. In the examples 1 and 2 and the comparative examples 1 to 3, at least one of the strength of the press in the manufacturing process and the temperature of the composition 110 irradiated with ultraviolet rays is different from each other as concretely shown in Table 1. In Table 1, "none" in the strength of the press means that no pressure other than the press is applied to bond the composition 110 and the light transmission film 130 to each other at the time of disposing the light transmission film 130 on the composition 110.

TABLE 1

| | strength of press | temperature (° C.) of composition irradiated with ultraviolet rays | $H_1$ (μm) | $H_2$ (μm) | $H_2/H_1$ (%) | $n_x$ | $n_y$ | Δn | transparency |
|---|---|---|---|---|---|---|---|---|---|
| Example 1 | strong | 27 | 25 | 5 | 20 | 1.54 | 1.66 | 0.12 | good |
| Example 2 | rather strong | 27 | 25 | 10 | 40 | 1.54 | 1.66 | 0.12 | good |
| Comparative example 1 | rather strong | 80 | 25 | 10 | 40 | 1.56 | 1.56 | 0.00 | good |
| Comparative example 2 | weak | 27 | 25 | 12 | 48 | 1.56 | 1.56 | 0.00 | good |
| Comparative example 3 | none | 27 | 25 | 15 | 60 | — | — | — | poor (whitened) |

In the examples 1 and 2 and the comparative examples 1 to 3, the shape of each of the projections in the brightness enhancement film was set to a right-angle isosceles triangular prism, the width of the projection in the brightness enhancement film was set to 50 μm, and the height was set to 25 μm. As a starting material used at the time of forming the liquid crystalline polymer having orientation, a solution (RMS03-001C manufactured by Merck Ltd. and whose phase transition temperature to an isotropic phase is 70° C.) obtained by mixing a solution derived by dissolving a liquid crystal monomer in a solvent with a photopolymerization initiator was used.

Cross-Sectional Shape

Sections in the arrangement direction of the brightness enhancement films were measured by a confocal scanning laser microscope (LEXT OLS3000 manufactured by Olympus Corporation). As a result, in the examples 1 and 2 and the comparative examples 1 to 3, each of the sections of the brightness enhancement films had a right-angle isosceles triangle shape having an apex angle of 90 degrees and a base angle of 45 degrees, which is the same as the irregular shape of the master 100. It was understood from the above that the shape of the projection in the brightness enhancement film is not collapsed.

Birefringence

Figure 10:
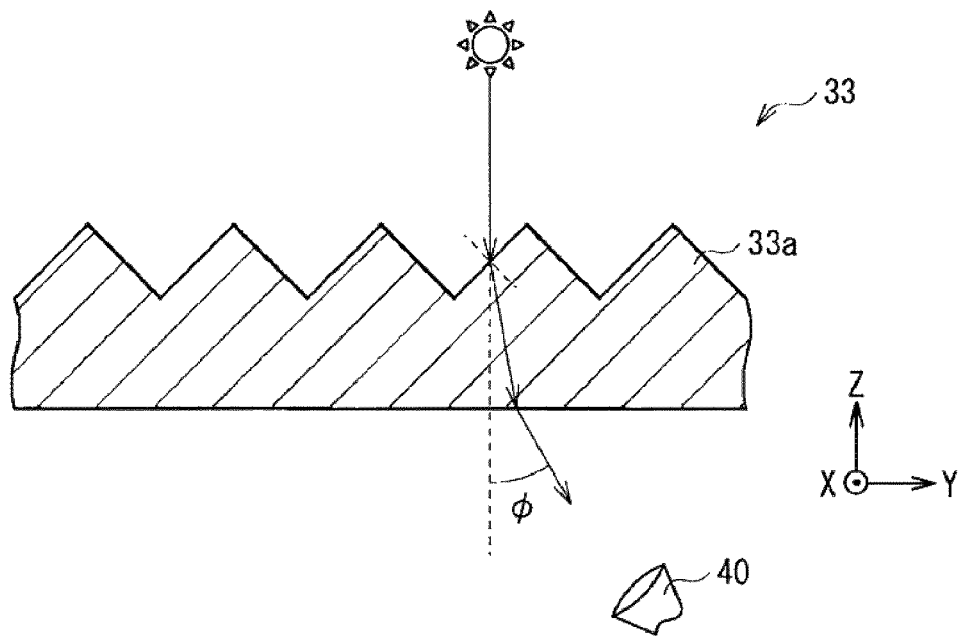
FIG. 10 is a conceptual diagram for explaining an example of a method of measuring birefringence.
Figure 11:
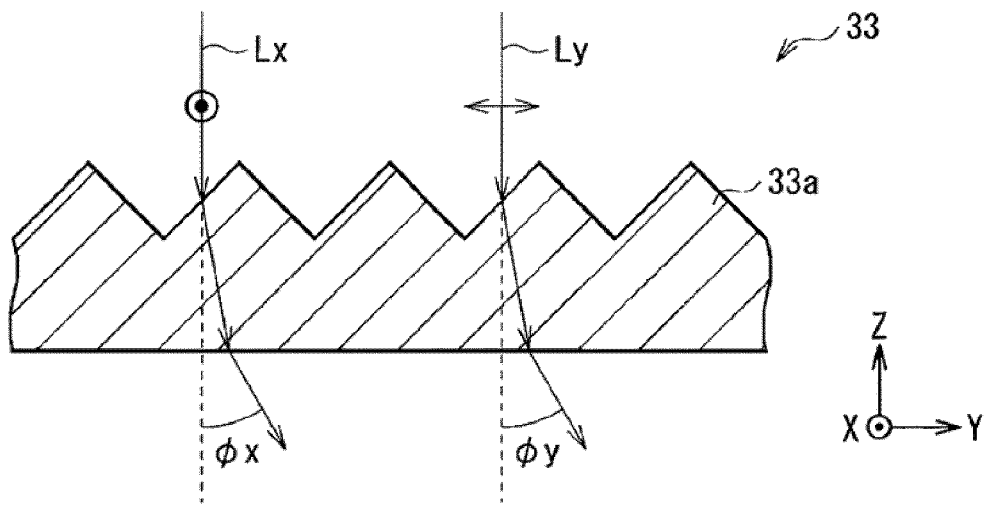
FIG. 11 is a conceptual diagram for explaining a polarizing axis of the birefringence.
Figure 12:
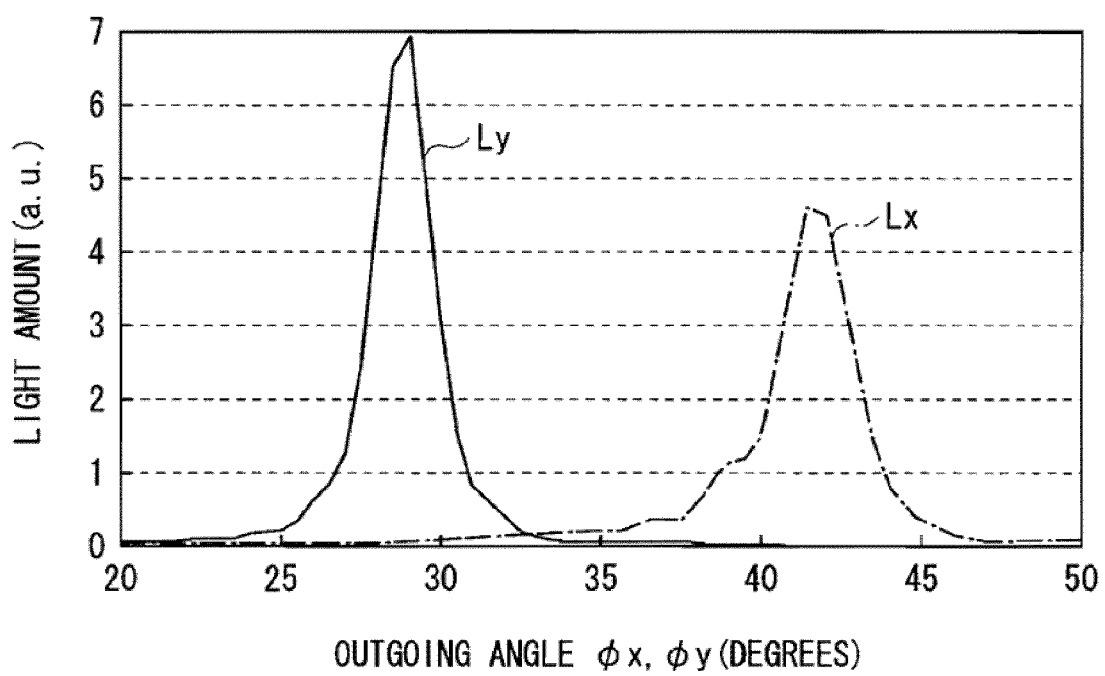
FIG. 12 is a relational diagram showing the relation between the emission angle of the brightness enhancement film and the light amount.

Next, the birefringence of the brightness enhancement film was measured. As shown in FIG. 10, polarization light was perpendicularly incident from the projections 33a side of the brightness enhancement film 33. Transmission light was detected by a measuring device 40. On the basis of the outgoing angle φ of the transmission light, the difference Δn (=nx−ny) between the refractive index nx in the extending direction of the projections 33a and the refractive index ny in the arrangement direction was calculated. When a polarization component which oscillates in the extending direction of the projections 33a was set as perpendicular polarization light Lx and a polarization component which oscillates in the arrangement direction of the projections 33a was set as horizontal polarization light Ly as shown in FIG. 11, the irradiation angle φx of the perpendicular polarization light Lx was larger than the irradiation angle φy of the horizontal polarization light Ly as shown in FIG. 12. The unit (a.u.) of the vertical axis in FIG. 12 denotes an arbitrary unit indicative of "relative value."

As the result of measurement, in the examples 1 and 2, the refractive index nx in the extending direction of the brightness enhancement film was 1.54, and the refractive index ny in the arrangement direction was 1.66. Consequently, the difference Δn of the refractive indexes was 0.12. It was therefore understood that by using the liquid crystalline polymer having orientation, refractive index anisotropy can be developed. On the other hand, in the comparative examples 1 to 3, the refractive index nx in the extending direction of the brightness enhancement film was 1.56 and the refractive index ny in the arrangement direction was 1.56, so that the difference Δn of the refractive indexes was 0.00. It was therefore understood that, even in the case of using the liquid crystalline polymer having orientation, when the strength of press is weak, or the temperature of the composition 110 irradiated with the ultraviolet ray is equal to or higher than the phase transition temperature $T_2$ (melting point), the refractive index anisotropy may not be developed. It is also understood that when the thickness H2 of the flange is thick ($H_2/H_1 \geqq 60\%$ or higher), the flange portion becomes white.

Although the configuration of the liquid crystal display apparatus has been concretely described in the foregoing embodiments and the like, all of the layers do not have to be provided and another layer may be also provided.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An optical sheet provided with a plurality of solid structures disposed continuously in one surface and having shape anisotropy in the one surface,
   wherein the solid structures contain liquid crystalline polymer having orientation in the one surface, and have refractive index anisotropy according to the orientation of the liquid crystalline polymer; wherein the optical sheet further comprises:
   a base material;
   an optical function layer formed on the base material,
   wherein the solid structures are formed on the surface opposite to the base material of the optical function layer, and
   a thickness of a part between the solid structures and the base material in the optical function layer is equal to or less than 40% of height of the solid structures.

2. The optical sheet according to claim 1, wherein each of the solid structures has a columnar shape extending in a predetermined direction in the one surface, and
   a refractive index in the extending direction of the solid structures is higher than a refractive index in a direction crossing the extending direction of the solid structures.

3. The optical sheet according to claim 1, wherein each of the solid structures has a columnar shape extending in a predetermined direction in the one surface, and
   a refractive index in the extending direction of the solid structures is lower than a refractive index in a direction crossing the extending direction of the solid structures.

4. The optical sheet according to claim 1, wherein the solid structure has a columnar shape extending in a predetermined direction in the one surface, and an orientation direction of the liquid crystalline polymer is parallel to the extending direction of the solid structures.

5. The optical sheet according to claim 1, wherein the solid structure is a prism of a polygonal column shape or a lenticular lens including a projected curved surface.

6. A display apparatus comprising:
   a display panel which is driven on the basis of an image signal;
   a pair of polarizers sandwiching the display panel;
   a light source for illuminating the display panel; and
   an optical sheet provided between the polarizers and the light source,
   wherein the optical sheet has a plurality of solid structures disposed continuously in one surface and having shape anisotropy in the one surface, and
   the solid structure contains a liquid crystalline polymer having orientation in the one surface and has refractive index anisotropy according to the orientation of the liquid crystalline polymer; wherein the optical sheet further comprises:
   a base material;
   an optical function layer formed on the base material,
   wherein the solid structures are formed on the surface opposite to the base material of the optical function layer, and
   a thickness of a part between the solid structures and the base material in the optical function layer is equal to or less than 40% of height of the solid structure.

7. The display apparatus according to claim 6, wherein a direction in which the refractive index is the lowest in the solid structure is parallel with a direction of a light transmission axis of the polarizer on the light source side or crosses the direction of the light transmission axis at an angle of more than 0 degree and less than 45 degrees.

* * * * *